H. P. UMBSEN.
DEVICE FOR TREATING THE EYES.
APPLICATION FILED SEPT. 8, 1919.
1,388,621.
Patented Aug. 23, 1921.
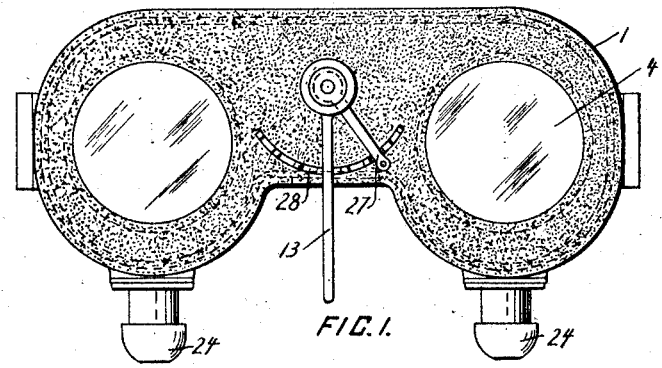
FIG. 1.
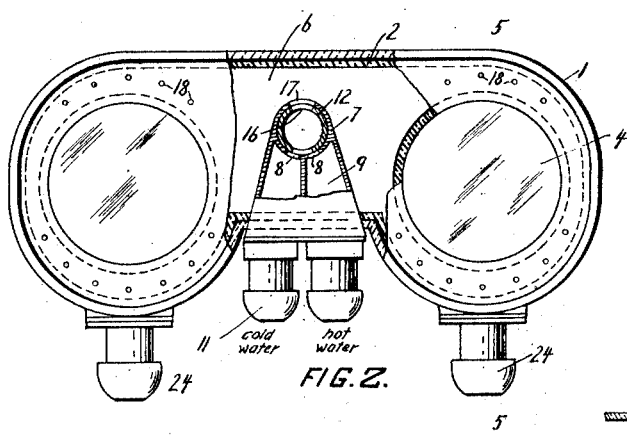
FIG. 2.
FIG. 3.   FIG. 4.   FIG. 5.
FIG. 7.
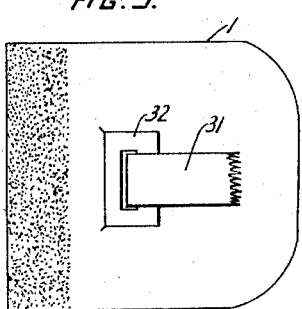
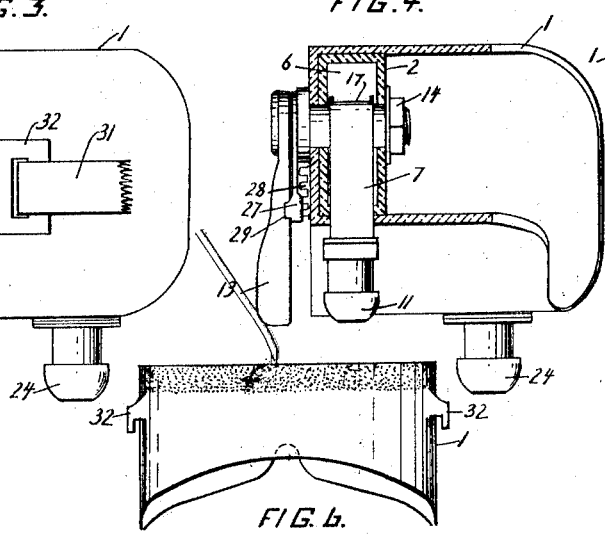
FIG. 6.
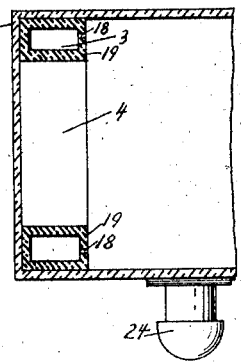
INVENTOR
H. P. UMBSEN
ATT'Y.

UNITED STATES PATENT OFFICE.

HENRY P. UMBSEN, OF SAN FRANCISCO, CALIFORNIA, ASSIGNOR TO UMBSEN MANUFACTURING CORPORATION, A CORPORATION OF DELAWARE.

DEVICE FOR TREATING THE EYES.

1,388,621.  Specification of Letters Patent.  Patented Aug. 23, 1921.

Application filed September 8, 1919. Serial No. 322,322.

*To all whom it may concern:*

Be it known that I, HENRY P. UMBSEN, a citizen of the United States, residing at San Francisco, in the county of San Francisco and State of California, have invented new and useful Improvements in Devices for Treating the Eyes, of which the following is a specification.

The present invention relates to an improved apparatus for medicinally treating the eyes with liquids such as water containing boric acid or plain water of any desired temperature.

In the accompanying drawing, Figure 1 is a front view of my improved apparatus; Fig. 2 is a broken rear view thereof; Fig. 3 is a side view thereof; Fig. 4 is a longitudinal section thereof; Fig. 5 is a broken longitudinal section thereof on the line 5—5 of Fig. 2; Fig. 6 is a plan view thereof on a reduced scale; Fig. 7 is a detail sectional view of a modification.

Referring to the drawing, 1 indicates a casing formed of any suitable material, as glass, closed at the front side and open at the rear sides, and the rear edge of which is conformed to fit closely against the forehead and nose of the patient. Into said casing is inserted a chamber 2 of hard rubber or any other suitable material. Said chamber comprises on each side an annular compartment 3, having a circular opening therethrough of about the size of the eye. The glass casing 1 in front of said openings 4 is transparent, but the remainder of said casing is of frosted glass. Said annular compartments 3 communicate with a central compartment 6, into which extends through holes in the bottom of the central compartment and casing 1 a valve casing 7 communicating at the bottom with ports 8 and conduits 9 communicating at the bottom with hard rubber nipples 11, on which can be attached rubber tubes leading from sources of supply of hot and cold water respectively or of any medicated liquid desired. The flow of liquid through said valve casing is controlled by a rotary hollow valve 12 extending through said valve casing 7 to the front thereof and being there provided with a handle 13 for turning said valve to permit more or less cold or hot water or medicated liquid, as desired, to enter said hollow valve. Said valve is secured in place by a nut 14 screwed on its rear end and at the top communicates by a port 16 with a port 17 in the valve casing, communicating with the central compartment 6, from which the water flows into the side compartment 3. From said side compartments, the water flows through small perforations 18 in their rear walls 19 and impinges upon the face of the patient around his eyes and escapes from said casing 1 by hard rubber nipples 24, to which may be attached drain tubes 26. The maximum extent to which the valve can be turned to admit any desired liquid therethrough can be regulated by moving a spring stop 27, which can be sprung into any one of the recesses in a circular rack 28. Said stop has a finger 29 against which the handle 17 impinges when it is rotated.

The device is held against the face of the patient by a ribbon or other band 31 secured to eyes 32 formed in the side walls of the casing 1.

Fig. 7 indicates a modification of the invention, showing a means for making a tight joint between the rear edge of the casing 1 and the face of the patient. Said rear edge is formed with an enlargement 33, around which is passed a grooved extension 34 from a rubber tube 36, the grooved extension 34 being given a certain degree of hardness by vulcanization while the rubber tube 36 remains soft.

I claim:—

1. In a device for treatment of the eyes, the combination of a casing, closed at the front side and open at the rear side, and of a form to fit closely against the face of the patient around the eyes, annular chambers in said casing having discharge openings in their rear walls, means for admitting a stream of liquid into said chambers, and means for directing the flow of liquid from said casing.

2. In a device for treatment of the eyes, the combination of a casing, closed at the front side and open at the rear side, and of a form to fit closely against the face of the patient around the eyes, means for separately supplying different liquids to said casing, and means for directing a stream of the liquid from said casing.

3. In a device for treatment of the eyes, the combination of a casing, closed at the front side and open at the rear side, and of a form to fit closely against the face of the patient around the eyes, a chamber in said casing having perforations in its rear wall, means for admitting a stream of liquid into said chamber, means for guiding a stream of liquid flowing from said casing in the rear of said chamber, and transparent portions in the front side of the casing.

4. In a device for treatment of the eyes, the combination of a casing, closed at the front side and open at the rear side, and of a form to fit closely against the face of the patient around the eyes, a chamber in said casing having perforations in its rear wall, means for admitting a plurality of streams of different kinds of liquid into said chamber, means for guiding a stream of liquid from said casing in the rear of said chamber.

5. In a device for treatment of the eyes, the combination of a casing, closed at the front side and open at the rear side, and of a form to fit closely against the face of the patient around the eyes, a chamber in said casing having perforations in its rear wall, means for admitting a plurality of streams of liquid into said chamber, means for varying the proportions of the streams of liquid admitted into said chamber, and means for guiding a stream of liquid from said casing in the rear of said chamber.

6. In a device for treatment of the eyes, the combination of a glass casing, closed at the front side and open at the rear side and of a form to fit closely against the face of the patient around the eyes, an annular chamber in said casing having perforations in its rear wall, means for admitting a plurality of streams of liquid into said chamber and means for guiding a stream of liquid from said casing in the rear of said chamber.

7. In a device for treatment of the eyes, the combination of a casing, closed at the front side and open at the rear side and of a form to fit closely against the face of the patient around the eyes, a chamber in said casing having perforations in its rear wall, a valve casing having ports therethrough adapted to communicate with sources of supply of liquids and a port therethrough adapted to communicate with said chamber, a rotary valve in said valve casing having ports therethrough adapted to communicate with said first-named port and with the last-named port respectively, and means for guiding a stream of liquid from said casing in the rear of said chamber.

8. In a device for treatment of the eyes, the combination of a casing, closed at the front side and open at the rear side and of a form to fit closely against the face of the patient around the eyes, a chamber in said casing having perforations in its rear wall, a valve casing having ports therethrough adapted to communicate with sources of supply of liquids and a port therethrough adapted to communicate with said chamber, a rotary valve in said valve casing having ports therethrough adapted to communicate with said first-named port and with the last-named port respectively, a handle for moving said rotary valve and a stop for said handle limiting its movement, and means for guiding a stream of liquid from said casing in the rear of said chamber.

9. In a device for treatment of the eyes, the combination of a glass casing, closed at the front side and open at the rear side and of a form to fit closely against the face of the patient around the eyes, a chamber in said casing having holes therethrough opposite to the eyes and having perforations in its rear wall, a valve casing having ports therethrough adapted to communicate with sources of supply of liquids and a port therethrough adapted to communicate with said chamber, and a rotary valve in said valve casing having ports therethrough adapted to communicate with said first-named port and with the last-named port respectively, a handle for moving said rotary valve.

10. In a device for treatment of the eyes, the combination of a casing, closed at the front side and open at the rear side, and of a form to fit closely against the face of the patient around the eyes, a rubber tube adjacent to the rear edge of said casing, to conform to the contour of the rear edge thereof, and having extensions on opposite sides of said rear edge and fitting closely against the same.

11. In a device for treatment of the eyes, the combination of a casing, closed at the front side and open at the rear side, and of a form to fit closely against the face of the patient around the eyes, a rubber tube adjacent to the rear edge of said casing, to conform to the contour of the rear edge thereof, and having extensions on opposite sides of said rear edge and fitting closely against the same.

HENRY P. UMBSEN.